Dec. 12, 1961 A. W. WALLENS 3,013,112

TELEPRINTER COMMUNICATIONS SYSTEMS

Filed May 14, 1957 2 Sheets-Sheet 1

Inventor
A. W. WALLENS
By [signature]
Attorney

Inventor
A. W. WALLENS
By [signature]
Attorney

United States Patent Office 3,013,112

Patented Dec. 12, 1961

3,013,112

TELEPRINTER COMMUNICATION SYSTEMS

Anthony Walter Wallens, Croydon, England, assignor to Creed & Company Limited, Croydon, England, a British company Filed May 14, 1957, Ser. No. 659,105
Claims priority, application Great Britain May 24, 1956
5 Claims. (Cl. 178—4.1)

This invention relates to teleprinter communication systems.

Selection facilities are provided in association with teleprinters of a teleprinter communication system whereby the operator at any teleprinter transmitter is enabled to transmit messages to other selected teleprinters. To clear the line, at the end of transmission, the line is broken for a certain period of time, usually of the order of one second, thus maintaining the electromagnet in the spacing condition during this period. When the line is restored to normal, namely the marking condition, spurious characters M, V, O or T may be printed due to the electromagnet returning to the marking condition part way through a cycle of operation of the receiving mechanism.

Other line break conditions, such as for example, when re-setting selective call circuits or other switching operations, may also in this manner cause the printing of spurious characters.

It is the object of the present invention to prevent the printing of spurious or unwanted characters.

According to the present invention there is provided a teleprinter communication system comprising a teleprinter and a control circuit associated with the teleprinter, wherein means are provided for arresting the receiver selection mechanism of the teleprinter in the stop position after a predetermined time of spacing condition of the teleprinter electromagnet.

Figures 1, 2:
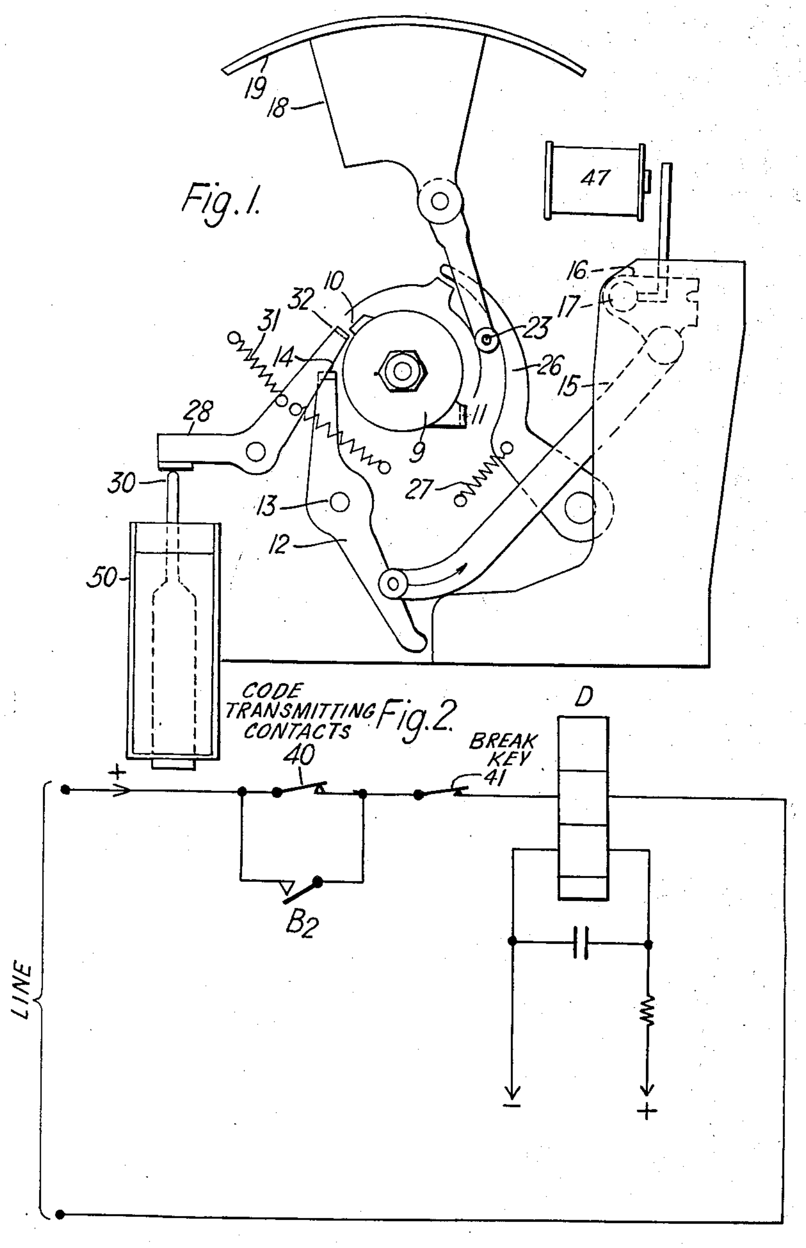

The invention will be better understood from the following description of one embodiment thereof, taken in conjunction with the accompanying drawings in which FIG. 1 shows so much of a known type of teleprinter as is required to understand the application of the present invention thereto. FIG. 2 is a diagrammatic view of the line circuit of a teleprinter and FIG. 3 is a circuit diagram of a control circuit for carrying out the present invention.

Referring to the drawings, it is assumed that a plurality of teleprinters, for example, six are connected in a single loop, facilities being provided for selection by any calling teleprinter station of one or a plurality of other stations.

FIG. 2 shows the line circuit for each teleprinter, this line circuit passing in series through normally closed teleprinter transmitter contacts 40, normally closed break key contacts 41, and a winding or windings of a polarised relay D for each teleprinter station. The line circuit is connected through either a single winding of relay D, as shown in FIG. 2, or through two windings in series in accordance with the value of the working current in the line. The relay D is provided with a bias winding, as shown in FIG. 2. The line circuits are all connected in series with a source of direct current potential, indicated by the + sign in FIG. 2, as is usual in telegraph systems, and thus form a closed loop with all the D relays normally operated.

Figure 3:
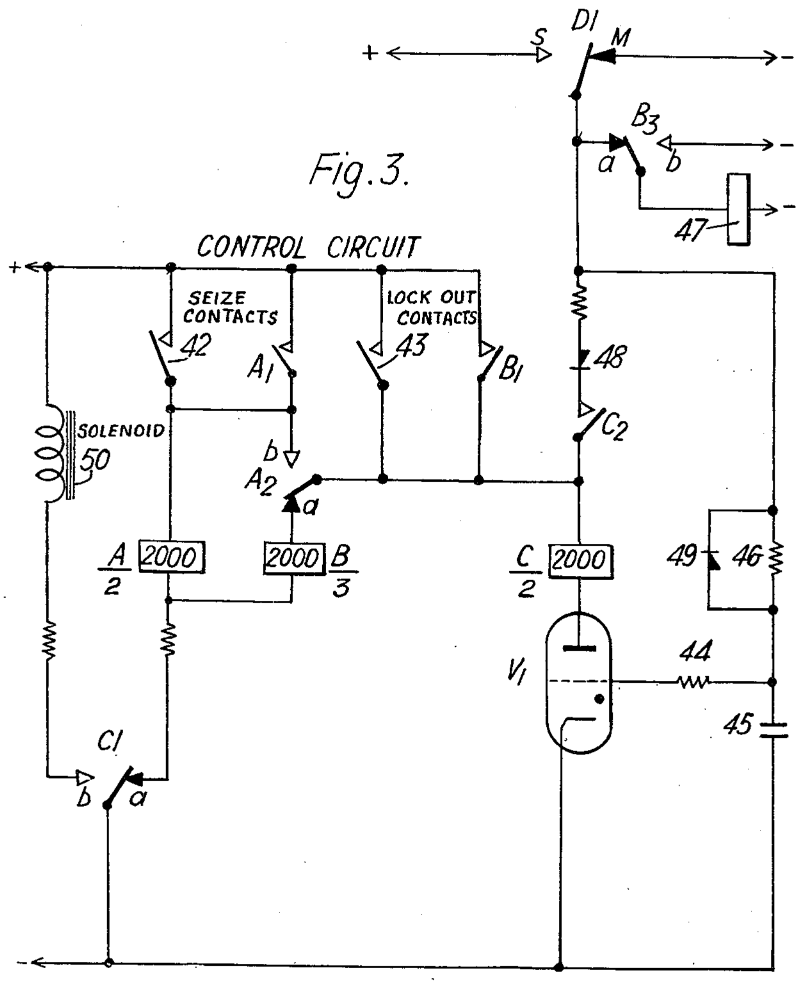

Relay D in each line circuit, by its contacts D1, shown in FIG. 3, controls the receiving magnet 47 of the teleprinter, which magnet operates the type-selecting cam sleeve of the teleprinter in a well known manner.

Referring now to FIG. 3, contacts 42 which are normally open, are adapted to be closed by a known operation of the mechanism when a signal combination representative of the particular teleprinter station is received over the line circuit and successively operates the relay D, and contacts 43 are closed by the mechanism when the normal bell signal is received. In carrying out the present invention these contacts 43 are utilised as lock-out contacts, as will be clear from the following description.

If the operator at one teleprinter station desires to select one or more of the other teleprinter stations, the operator sends first a signal combination representing his own station by means of keys which cause the successive operation of the transmitter contacts 40, and then a combination representative of a station it is desired to call. For clarity of description it will be assumed that there are six teleprinter stations connected in series in the loop and that the operator at station number one desires to select station numbers three and six for receipt of a message. It will be understood that the loop is a closed circuit and that all the D relays are operated. The operator at station number one then sends the combination or combinations representing first his own station, then those for station number three and then the combinations representing the station number six. He does so by operating keys, not shown, which cause the contacts 40 of his line circuit to open successively in accordance with the signal combination.

At the calling teleprinter and at all teleprinter stations the relay D, FIG. 2, responds to the received signals and by its contacts D1 passes them on to the teleprinter magnet 47. At each opening of contacts 40, the D relays release and the armature D1 of each moves to the "space" position where it applies positive potential to the magnet winding to operate it.

At each of the teleprinter stations, the armature of magnet 47, not shown in FIG. 1, when the magnet is energized, rotates a shaft 17, FIG. 1, and through lever 16 and link 15 rotates a detent 12 about its pivot 13 and thus withdraws a stop latch 14 from engagement with a lug 10 on a pivot cam 9 which is thereupon caused to make one complete rotation by means of a friction clutch from the motor (not shown) of the teleprinter. After a brief interval, a second lug 11 on the pilot cam 9 acts on a roller 23 to rotate a lever 26 in a clockwise direction against the pull of a spring 27. Movement of the lever 26 causes withdrawal of a detent (not shown) to allow rotation of a selector cam sleeve which then makes one complete rotation.

The position of roller 23 about the circumference of the pilot cam 9 is controlled by means of a frame 18 manually adjustable along a scale 19 for the purpose of the well known orientation adjustment of the teleprinter.

At station No. 1 the selector cam sleeve operates in conjunction with the receipt of the combinations representing station No. 1 to close contacts 42 in the teleprinter. These contacts do not at this time close in any other teleprinter station.

Closure of contacts number 42, FIG. 3, closes the circuit of relay A which operates and at contacts A1, closes a locking circuit for itself. At contacts A2 a positive voltage is applied over relay C to the anode of a gas-filled triode VI. The valve VI does not, however, pass current, since the control electrode is connected over resistance 44 to a point which is at present at negative potential.

At teleprinter number three the contacts 42 close on receipt of the combination for that station and relay A operates in the same way as for teleprinter number one. The same thing then happens as teleprinter No. 6 when the combinations representing that station are sent. It will thus be seen that the A relays are operated at stations one, three, and six, but are not operated at the other stations.

The operator at the calling teleprinter station now operates the key for sending the bell signal combination, and at all the stations the successive operation of the relay D causes the mechanism to respond in such a manner that contacts 43 (FIG. 3) close. Nothing further happens at stations one, three, and six. At teleprinters other than the calling station and teleprinters numbers three and six, the closure of contacts 43 completes the circuit for relay B which, at contacts B1, closes a locking circuit for itself. Contacts B2 in FIG. 2 short-circuit the transmitter contacts 40 to prevent interference with the transmission from station one. Contacts B3 change over and disconnect the electro-magnet 47 of the teleprinter from the control by the line relay contacts D1 and keep this teleprinter magnet operated to mark in the normal way by operating the keys which control the successive openings and closings of the contacts 40.

The operator at the calling station now transmits the message. This is relayed to teleprinters numbers three and six through the contacts D1 of the receiving relay and the normal contacts B3 of relay B to the electro-magnet 47. Similarly, at the calling teleprinter, the transmitted message is relayed to the teleprinter magnet to provide a home record.

The armature of the relay D is connected through resistance 46 and a rectifier 49 in shunt, and capacitor 45 in series to negative potential. The side of capacitor 45 remote from the negative potential is connected over the resistance 44 to the control electrode of the gas-filled triode V1. The time constant of the circuit 46, 45 is dimensioned to be half a second so that no succession of spacing signals that occur in the message will cause the potential of the control electrode of V1 to build up to striking potential.

At the end of the message the operator at the calling station sends a clear signal by operating the key that opens contacts 41, FIG. 2, for a period of nominally half a second.

This long spacing signal causes the contacts D1 to remain in spacing position during the interval of the signal. A spacing condition is relayed to the electromagnet 47 of the teleprinter and the pilot cam 9 (FIG. 1) and following it the selector cam sleeve start to rotate and tend to continue to rotate in the normal manner so long as the electromagnet ramains in spacing condition. Contacts D1 in spacing position connect positive voltage to charge up capacitor 45 (FIG. 3). If the charging current lasts for more than half a second (the time constant of resistor 46 and capacitor 45), the control electrode of valve V1 has applied thereto a sufficiently high voltage to cause the valve V1 to strike and so operate the relay C. Contacts C1 change over and operate a solenoid 50. This solenoid is shown in FIG. 1, and when operated, a core 30 is moved and rotates a detent 28 against the action of a spring 31. The detent 28 is provided with a stop latch 32 which engages the lug 10 of the pilot cam 9 and thus arrests this pilot cam close to its normal stopping position. In this position the roller 23 is restored into normal position and so allows the lever 26 to replace the detent for the selector cam sleeve into position to arrest said sleeve in the normal stop position. This ensures that when the teleprinter magnet 47, FIG. 3, at any of the teleprinter's numbers one, three and six is restored to marking position, upon the relay contacts D1 moving back into marking position, the magnet has no influence on the selector cam assembly, since the latter is in its normal position and the printing of spurious characters is prevented. Such spurious characters could be selected and printed if the electro-magnet is restored to mark when the selector cam sleeve is part way through its cycle of operations.

At the teleprinters numbers one, three and six which have been engaged in the communication, contacts C1, in changing over to operate the solenoid 50, also disconnect negative voltage from relays A and B; contacts C2 close and lock relay C to the positive voltage from the spacing contacts of relay D1. When relay A releases, contacts A1 open without effect and contacts A2 change over also without effect.

When finally the break key contacts 41 are reclosed, contacts D1 change over to mark and supply a negative voltage to relay C and the valve V1. The discharge in the valve V1 is extinguished and relay C releases. Contacts C1 change over and contacts C2 open without any effect.

At teleprinters other than the calling teleprinter station and numbers three and six, the contacts D1 respond to the long space signal and cause a discharge to strike in valve V1 and relay C to operate in the same manner as previously described. Contacts C1 open the circuit for relay B and contacts B1 open, removing the locking circuit for this relay. Contacts B2 open and remove the short circuit from across the transmitter contacts 40 and contacts B3 change over, putting the electro-magnet 47 once more under the control of contacts D1 of the line relay. The solenoid 50 is energised and ensures that if the teleprinter is running, no spurious characters will be printed. When the line is restored by the reclosure of contacts 41 at the original calling teleprinter, the valve V1 is restored to normal and relay C released as described above.

While we have described the invention in connection with this preferred embodiment, it is to be understood that this description is made only by way of example and not as a limitation on the scope of the invention.

What we claim is:

1. In a teleprinter communication system, a teleprinter mechanism adapted to be driven through a plurality of positions including a stop position, a first electromagnet having mark and space positions, a line circuit for receiving mark and space signals and for controlling the positioning of the first electromagnet, and control means for arresting the said mechanism in the stop position responsive to the electromagnet remaining in the space position for a predetermined time.

2. A teleprinter communication system according to claim 1 wherein the said control means includes a second electromagnet and a timing circuit for operating the second electromagnet after the said predetermined time.

3. A teleprinter communication system according to claim 2 wherein the said mechanism includes a rotatable cam and means for operating it to drive the mechanism through the said positions, and wherein the said control means includes a detent for selectively arresting the rotation of the said cams when the mechanism reaches its stop position.

4. A teleprinter communication system according to claim 3 wherein linking means is provided for interconnecting the said second electromagnet and said detent, and wherein operation of the second electromagnet under control of the said timing circuit actuates the said detent through the linking means to arrest the rotation of said cam, in the said stop position.

5. A teleprinter communication system according to claim 2 wherein the said timing means includes an electron discharge tube having a grid, a third electromagnet in the anode circuit of said tube, a charging circuit having a time constant equal to said predetermined time connected to the gird of said tube, means for operating the said third electromagnet upon conduction of said tube, and means for closing an operating path for said second electromagnet upon the operation of said third electromagnet.

References Cited in the file of this patent

UNITED STATES PATENTS

| | | |
|---|---|---|
| 1,712,528 | Swezey | May 14, 1929 |
| 2,495,131 | Poulter | Jan. 17, 1950 |
| 2,652,446 | Oberman | Sept. 15, 1953 |
| 2,675,537 | Cahill | Apr. 13, 1954 |